US012465235B2

(12) United States Patent
Zheng et al.

(10) Patent No.: US 12,465,235 B2
(45) Date of Patent: Nov. 11, 2025

(54) BODY MOLD FOR A MAGNETIC RESONANCE IMAGING SYSTEM

(71) Applicant: GE Precision Healthcare LLC, Wauwatosa, WI (US)

(72) Inventors: Shuo Zheng, Beijing (CN); Qilin Lu, Beijing (CN); Kun Wang, Beijing (CN); Tao Wang, Beijing (CN); Jiabin Yao, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 427 days.

(21) Appl. No.: 17/128,702

(22) Filed: Dec. 21, 2020

(65) Prior Publication Data

US 2021/0196142 A1 Jul. 1, 2021

(30) Foreign Application Priority Data

Dec. 27, 2019 (CN) .......................... 201911378047.0

(51) Int. Cl.
*A61B 5/055* (2006.01)
*G01R 33/385* (2006.01)
*G01R 33/50* (2006.01)
*G01R 33/54* (2006.01)

(52) U.S. Cl.
CPC .......... *A61B 5/055* (2013.01); *G01R 33/3852* (2013.01); *G01R 33/50* (2013.01); *G01R 33/543* (2013.01)

(58) Field of Classification Search
CPC ...... G01R 33/58; G01R 33/50; G01R 33/243; G01R 33/3852; G01R 33/543; G01R 33/5602; G01R 33/56563; G01R 33/56572; A61B 5/055

See application file for complete search history.

(56) References Cited

U.S. PATENT DOCUMENTS

| 10,018,690 | B2  |   | 7/2018 | Overweg |            |
|------------|-----|---|--------|---------|------------|
| 10,539,642 | B2  | * | 1/2020 | Vesanen | G01R 33/58 |
| 11,391,804 | B2  | * | 7/2022 | Golay   | C09K 5/063 |
| 2014/0197833 | A1 | * | 7/2014 | Ryu     | G01R 33/288 |
|            |     |   |        |         | 324/309    |

* cited by examiner

*Primary Examiner* — Michael J Carey
*Assistant Examiner* — Maria Christina Talty
(74) *Attorney, Agent, or Firm* — Fletcher Yoder, P.C.

(57) ABSTRACT

Provided in embodiments of the present invention are a body mold, a magnetic resonance imaging system, and a main magnetic field evaluation method and a gradient field evaluation method therefor. The body mold comprises a plurality of substrates, wherein the plurality of substrates are sequentially arranged to form a multi-layer structure in a three-dimensional space. Each substrate is provided with a plurality of first accommodation bodies for accommodating first resonant volumes and a plurality of second accommodation bodies for accommodating second resonant volumes. The plurality of first accommodation bodies and the plurality of second accommodation bodies are arranged at intervals. The first resonant volumes and the second resonant volumes have different longitudinal relaxation times T1.

8 Claims, 8 Drawing Sheets

BODY MOLD FOR A MAGNETIC RESONANCE IMAGING SYSTEM

TECHNICAL FIELD

Embodiments disclosed in the present invention relate to medical imaging technologies, and in particular, to a magnetic resonance imaging system, a body mold for a magnetic resonance imaging system, a main magnetic field evaluation method for the magnetic resonance imaging system, and a gradient field evaluation method for the magnetic resonance imaging system.

BACKGROUND

Magnetic resonance imaging (MRI), as a medical imaging modality, can obtain images of the human body without using X-rays or other ionizing radiation. MRI uses a magnet having a strong magnetic field to generate a static magnetic field B0. When a to-be-imaged part of the human body is positioned in the static magnetic field B0, nuclear spin associated with hydrogen nuclei in human tissues is polarized. The tissue of the to-be-imaged part thus generates a longitudinal magnetization vector at a macroscopic level, which is in a balanced state. After a radio-frequency field B1 intersecting the direction of the static magnetic field B0 is applied, the direction of rotation of protons changes, the longitudinal magnetization vector decays, and the tissue of the to-be-imaged part generates a transverse magnetization vector at a macroscopic level. After the radio-frequency field B1 is removed, the longitudinal magnetization strength is gradually restored to the balanced state, the transverse magnetization vector decays in a spiral manner until it is restored to zero. A free induction decay signal is generated during decay of the transverse magnetization vector. The free induction decay signal can be acquired as a magnetic resonance signal, and a tissue image of the to-be-imaged part can be reconstructed on the basis of the acquired signal.

In order to guarantee the magnetic resonance imaging quality, the static magnetic field in the examination space (such as a scanning chamber defined by a main magnet) at least needs to have desirable uniformity, which is achieved by performing uniformity correction or shimming to the static magnetic field.

In a conventional correction approach, magnetometers are needed to measure the magnetic field strength in the scanning chamber. In order to do so, it is needed to dispose one or a plurality of magnetometers on a support or a similar apparatus and mount the support in the scanning chamber. The support is then manually rotated to move the magnetometer to a to-be-measured sampling position in a scanning space to measure the magnetic field strength. Shimming is subsequently performed on the basis of the measured magnetic field strength. For example, shimming pieces are added to the main magnet to adjust the magnetic field strength of a specific position.

In addition to being costly and having a complicated structure, such a measuring device is difficult to operate, and the process is time-consuming. Particularly, in remote geographical locations where a single measuring device is shared by a number of far apart medical institutions, high transportation costs are incurred, and damage is easily caused during transportation. The medical institutions thus have to spend considerable time on communicating and waiting.

SUMMARY

One embodiment of the present invention provides a body mold for a magnetic resonance imaging system, the body mold comprising a plurality of substrates, wherein the plurality of substrates are sequentially arranged to form a multi-layer structure in a three-dimensional space. Each substrate is provided with a plurality of first accommodation bodies for accommodating first resonant volumes and a plurality of second accommodation bodies for accommodating second resonant volumes. The plurality of first accommodation bodies and the plurality of second accommodation bodies are arranged at intervals. The first resonant volumes and the second resonant volumes have different longitudinal relaxation times T1.

Optionally, the first resonant volumes comprise a first liquid, and the second resonant volumes comprise a second liquid.

Optionally, the first liquid and the second liquid have different compositions.

Optionally, the first liquid and the second liquid are solutions having different concentrations.

Optionally, two adjacent first accommodation bodies are different in at least one of the following: shape and size.

Optionally, two adjacent second accommodation bodies are different in at least one of the following: shape and size.

Optionally, the plurality of substrates are sequentially arranged at specific angles to form the multi-layer structure having a fan-shaped cross section.

Optionally, the angle between two substrates of the body mold farthest from each other is 180 degrees.

Optionally, the body mold further comprises a first carrying element and a second carrying element for carrying the plurality of substrates, and two ends of each substrate are detachably connected to the first carrying element and the second carrying element respectively.

One embodiment of the present invention further provides a main magnetic field evaluation method for a magnetic resonance imaging system, comprising:
 imaging a body mold placed in a main magnetic field space of the magnetic resonance imaging system to separately obtain a first image and a second image, wherein the body mold is the body mold according to any one of claims 1 to 8, the first image comprises a plurality of first resonant volumes on one substrate of the body mold, and the second image comprises a plurality of second resonant volumes on the substrate; and evaluating a magnetic field strength in the main magnetic field space on the basis of the first image and the second image.

Optionally, the evaluating a magnetic field strength in the main magnetic field space on the basis of the first image and the second image comprises:
 merging the first image and the second image; and determining a pixel position where distortion occurs in the merged image, and determining a magnetic field strength at a physical position having a mapping relationship with the pixel position where distortion occurs in the magnetic field space.

Optionally, the obtaining the first image comprises: performing a first scanning sequence on the body mold, wherein a radio-frequency inversion pulse for inhibiting the second resonant volumes is applied before a radio-frequency excitation pulse; and the obtaining the second image comprises: performing a second imaging sequence on the body mold, wherein a radio-frequency inversion pulse for inhibiting the first resonant volumes is applied before a radio-frequency excitation pulse.

One embodiment of the present invention further provides a gradient field evaluation method for a magnetic resonance imaging system, comprising:

imaging a body mold placed in a main magnetic field space of the magnetic resonance imaging system to separately obtain a first image and a second image, wherein the body mold is the body mold according to any one of claims 1 to 8, the first image comprises a plurality of first resonant volumes on one substrate of the body mold, and the second image comprises a plurality of second resonant volumes on the substrate; and evaluating an imaging error of a gradient field in the main magnetic field space on the basis of the first image and the second image.

One embodiment of the present invention further provides a magnetic resonance imaging system, comprising:
a scanner, forming a main magnetic field space where a body mold can be placed; and
a controller, for controlling operation of the scanner and performing the method according to any of the optional embodiments described above.

It should be understood that the brief description above is provided to introduce in simplified form some concepts that will be further described in the Detailed Description of the Embodiments. The brief description above is not meant to identify key or essential features of the claimed subject matter. The protection scope is defined uniquely by the claims that follow the detailed description. Furthermore, the claimed subject matter is not limited to implementations that solve any disadvantages noted above or in any section of the present disclosure.

BRIEF DESCRIPTION OF THE DRAWINGS

The present invention will be better understood by reading the following description of non-limiting embodiments with reference to the accompanying drawings.

DETAILED DESCRIPTION OF THE EMBODIMENTS

Figure 1:
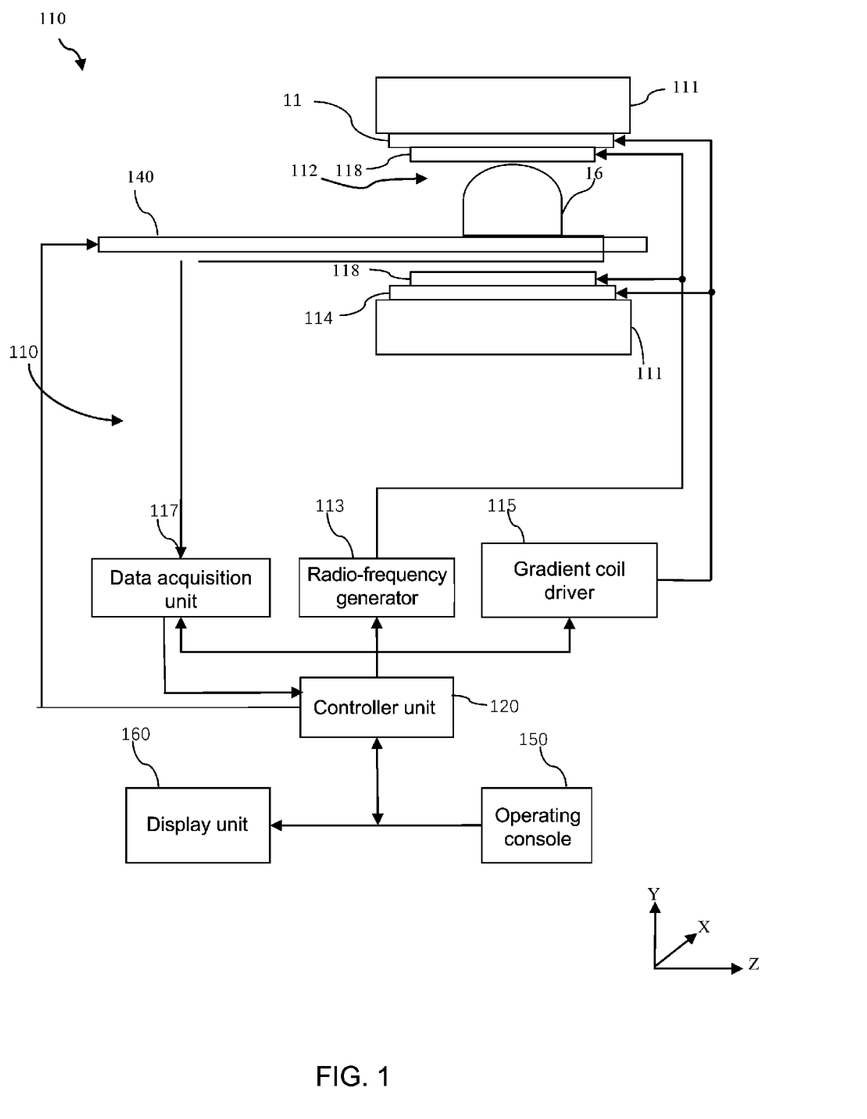
FIG. 1 is a schematic structural diagram of a magnetic resonance imaging system.

FIG. 1 is a schematic structural diagram of a magnetic resonance imaging system. The magnetic resonance imaging system 100 includes a scanner 110 and a controller 120. The controller 120 is coupled to the scanner 110 and used for controlling operation of the scanner 110, such as controlling the scanner 110 to perform a scanning sequence on an object 16 to obtain image data of the object 16. When scanning-imaging a human body, the object 16 may be a human anatomical structure to be diagnosed. In a main magnetic field or gradient field evaluation, the object 16 may be a body mold provided in an embodiment of the present invention. The controller 120 may evaluate a main magnetic field or a gradient field in a space where the body mold is located on the basis of image data of the body mold.

Specifically, the controller 120 may send a sequence control signal to relevant components of the scanner 110 (such as a radio-frequency generator and a gradient coil driver that will be described below) through a sequence generator (not shown), so that the scanner 110 performs the preset scanning sequence.

In an example, the scanner 110 may include a main magnet assembly 111. The main magnet assembly 111 usually includes an annular superconducting magnet defined in a housing, where the annular superconducting magnet is mounted in an annular vacuum container. The annular superconducting magnet and the housing thereof define a cylindrical space surrounding the object 16, namely, a main magnetic field space such as the scanning chamber 112 shown in FIG. 1. The scanning chamber 112 defines an imaging area of the magnetic resonance imaging system or at least part of the imaging area. The main magnet assembly 111 generates a constant magnetic field, e.g., a static magnetic field B0, in a Z direction of the scanning chamber 112. The magnetic resonance imaging system transmits a static magnetic pulse signal to the object 16 (e.g., the body mold) placed in the scanning chamber 112 using the formed static magnetic field B0, so that protons in resonant volumes of the object 16 process in an ordered manner to generate a longitudinal magnetization vector.

As shown in FIG. 1, the scanner 110 further includes an RF transmit coil 118, a radio-frequency generator 113, a gradient coil assembly 114, a gradient coil driver 115, and a data acquisition unit 117.

The radio-frequency generator 113 is used for generating a radio-frequency pulse, such as a radio-frequency excitation pulse, in response to the control signal of the controller 120. The radio-frequency excitation pulse is amplified (by a radio-frequency power amplifier (not shown), for example) and then applied to the RF transmit coil 118, so that the RF transmit coil 112 emits to the object 16 a radio-frequency field B1 orthogonal to the static magnetic field B0 to excite nuclei in the aforementioned resonant volumes, and a transverse magnetization vector is generated.

A body coil may be connected to a transmit/receive (T/R) switch (not shown). The transmit/receive switch is controlled so that the body coil can be switched between the transmit mode and the receive mode. In the receive mode, the body coil may be used for receiving a magnetic resonance signal from the object 16.

After the end of the radio-frequency excitation pulse, a free induction decay signal, namely a magnetic resonance signal that can be acquired, is generated in the process that the transverse magnetization vector of the object 16 is gradually restored to zero.

The gradient coil assembly 114 forms a varying magnetic field in an imaging space so as to provide three-dimensional position information to the magnetic resonance signal, and furthermore, generates a compensating magnetic field of the static magnetic field to shim the static magnetic field.

The gradient coil assembly 114 may include three gradient coils. Each of the three gradient coils generates a gradient magnetic field inclined to one of three spatial axes (for example, X-axis, Y-axis, and Z-axis) perpendicular to each other, and generates a gradient field according to imaging conditions in each of a slice selection direction, a phase encoding direction, and a frequency encoding direction. More specifically, the gradient coil assembly 114 applies a gradient field in the slice selection direction (Z direction) of the object 16 so as to select a slice. When scanning the slice, the RF transmit coil 118 transmits the RF excitation pulse to the slice of the object 16 and excites the slice. The gradient coil assembly 114 then applies a gradient field in the phase encoding direction of the scanning object 16 so as to perform phase encoding on a magnetic resonance signal of the excited slice. The gradient coil assembly 114 then applies a gradient field in the frequency encoding direction of the object 16 so as to perform frequency encoding on the magnetic resonance signal of the excited slice.

The gradient coil driver 115 is used for providing a suitable current/power to each of the aforementioned three gradient coils in response to the sequence control signal or shimming control signal sent by the controller 120.

The data acquisition unit 117 is used for acquiring the magnetic resonance signal (for example, received by the body coil or a surface coil) in response to a data acquisition control signal of the controller 120. The data acquisition unit 117 may include, for example, a radio-frequency preamplifier, a phase detector, and an analog/digital converter, where the radio-frequency preamplifier is used for amplifying the magnetic resonance signal, the phase detector is used for performing phase detection on the amplified magnetic resonance signal, and the analog/digital converter is used for converting the phase-detected magnetic resonance signal from an analog signal to a digital signal.

The controller 120 may include an image reconstruction unit to reconstruct an image of any slice of the object 16 on the basis of the aforementioned digitized magnetic resonance signal.

As shown in FIG. 1, the magnetic resonance imaging system 100 further includes a table 140, an operating console 150, and a display unit 160.

The table 140 is used for carrying the object 16 and advancing in the Z direction to enter or exit the scanning chamber in response to the control of the controller 120. For example, the table 140 may position the body mold according to the embodiment of the present invention at a suitable position in the main magnetic field space, so as to measure the magnetic field strength in the main magnetic field space where the object 16 is located.

The controller 120 may generate a control signal on the basis of an operation performed by a user via the operating console 150 or some automatic detection results, so as to control the scanner 110 and the table 140, for example, to perform corresponding operations. The operating console 150 may include a user input device, such as a keyboard and a mouse, where an operator may input various control signals to the controller 120 through the user input device.

The display unit 160 may be connected to the operating console 150 to display an operation interface and may further display various data or images generated in the data processing process.

The controller 120 may include a computer and a storage medium, where a predetermined control program and a data processing program to be executed by the computer are recorded on the storage medium. For example, a program for implementing a main magnetic field evaluation method and a gradient field evaluation method according to embodiments of the present invention may be stored on the storage medium. The storage medium may include, for example, a ROM, a floppy disk, a hard disk, an optical disk, a magneto-optical disk, a CD-ROM, or a non-volatile memory card.

Figure 2:
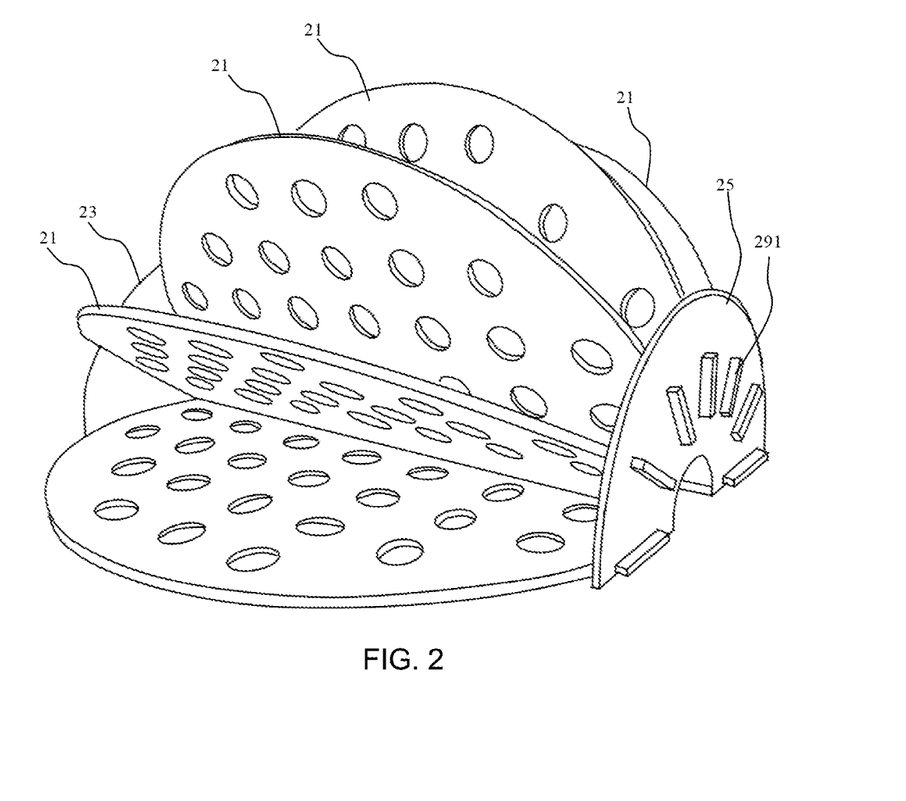
FIG. 2 is a schematic structural diagram of a body mold according to one embodiment of the present invention.

FIG. 2 is a schematic structural diagram of a body mold according to an embodiment of the present invention. The body mold may be used in a magnetic resonance imaging system. For example, the body mold may be used as the object 16 in FIG. 1. As shown in FIG. 2, the body mold includes a plurality of substrates 21, where the plurality of substrates 21 are sequentially arranged to form a multi-layer structure in a three-dimensional space. The three-dimensional space formed by the substrates 21 may be, for example, at least part of an approximate sphere (for example, an approximate hemisphere or spherical cap). The shape and size of the space may be determined on the basis of the shape and size of the space formed by the scanning chamber 112 and the table 140 to, for example, enable the body mold to be positioned on the table 140 and accommodated in the scanning chamber 112 and cover the main magnetic field space to be shimmed in the scanning chamber (such as a region of interest) as much as possible.

The substrate 21 is used for allowing imageable resonant tissues to be arranged thereon according to certain rules. Those skilled in the art should understand that resonant tissues or resonant objects, resonant media, resonant volumes, or the like refer to substances in which nuclei can be excited by radio frequency in a static magnetic field environment so as to generate detectable magnetic resonance signals.

In one embodiment of the present invention, the plurality of substrates 21 are sequentially arranged at specific angles to form the multi-layer structure having a fan-shaped cross-section. For example, the plurality of substrates may be substantially radial. Thus, in magnetic resonance imaging on the basis of the body mold, an image of resonant tissues on each layer of substrate 21 can be reconstructed, so that in evaluating the main magnetic field (for example, evaluating the uniformity of the main magnetic field), three-dimensional position information of resonant tissues in a corresponding image can be mapped to physical position information of the resonant tissues on the substrate 21 in the magnetic field space.

On the basis of the aforementioned application in main magnetic field evaluation, the substrates 21 should have an appropriate density to ensure the accuracy and resolution of position mapping. That is, adjacent substrates 21 should have an appropriate angle therebetween, or resonant tissues between the layers should have an appropriate distance by adjusting the thickness, quantity, and the like of the substrates 21.

Optionally, the angle between two substrates 21 of the body mold farthest from each other according to the embodiment of the present invention is 180 degrees. For example, the plurality of substrates 21 may sequentially form a gradually changing angle with one plane to form a radial structure upward from the plane. If ends of the radial structure are connected, a spherical cap or hemisphere may be substantially formed. In this manner, the two substrates 21 having an angle of 180 degrees can be attached to the surface of the table so as to position the body mold on the table.

Optionally, as shown in FIG. 2, the body mold according to the embodiment of the present invention includes a first carrying element 23 and a second carrying element 25.

When the plurality of substrates 21 are assembled to form the body mold, the first carrying element 23 and the second carrying element 25 are disposed opposite to each other at two ends of each substrate 21, where the two ends of each substrate 21 are detachably connected to the first carrying element 23 and the second carrying element 25 respectively. For example, the first carrying element 23 and the second carrying element 25 may be each provided with a plurality of mounting slots (not shown). The two ends of each substrate 21 may be each provided with two opposing protrusions 291 that extend into two opposing mounting slots on the first carrying element 23 and the second carrying element 25, respectively. For ease of removal, the size of the mounting slots is greater than the size of the corresponding protrusions 291 so that the protrusions 291 can be removed from the corresponding mounting slots. Through a detachable mounting structure, the body mold can have a more reasonable structure and a small volume during transportation, so as to prevent structural damage during transportation and increase the convenience of transportation.

Optionally, the material of the substrate 21 may be plastic, rigid foam, or any other material not affected by the magnetic field.

Figure 3:
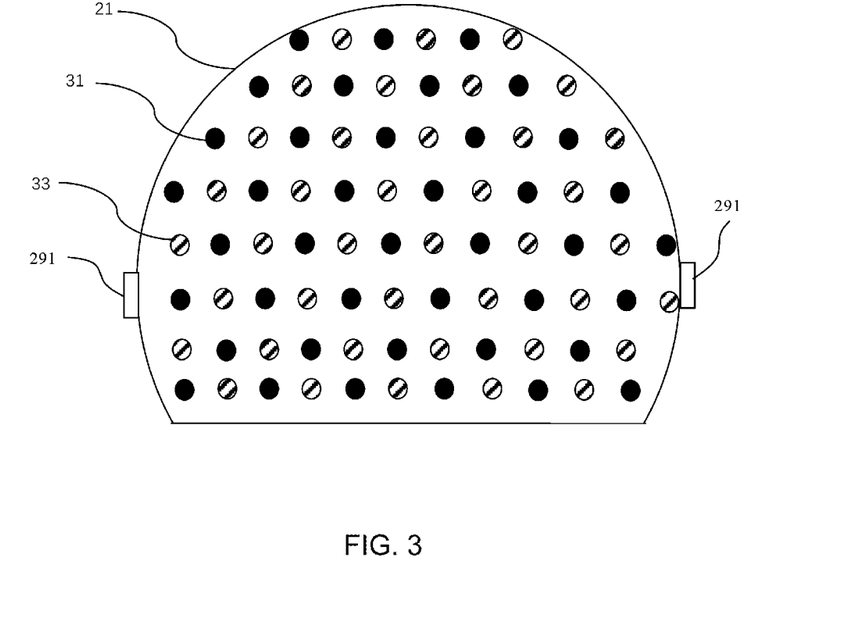
FIG. 3 is a schematic structural diagram of a substrate in FIG. 2.

FIG. 3 is a schematic structural diagram of one embodiment of the substrate 21, where each substrate 21 is provided with a plurality of first accommodation bodies 31 and a plurality of second accommodation bodies 33. The first accommodation bodies 31 are used for accommodating first resonant tissues, the second accommodation bodies 33 are used for accommodating second resonant tissues, and the plurality of first accommodation bodies 31 and the plurality of second accommodation bodies 33 are arranged at intervals. Only for the purpose of facilitating understanding and more clearly describing the first accommodation bodies 31 and the second accommodation bodies 33, in the figure, the first accommodation bodies 31 are represented by solids, and the second accommodation bodies 33 are represented by stripes.

The plurality of first accommodation bodies 31 and the plurality of second accommodation bodies 33 are arranged at intervals, so that two adjacent first accommodation bodies 31 have a sufficient distance therebetween. The distance may be achieved by providing at least the second accommodation body 33 between the two adjacent first accommodation bodies 31. Similarly, the sufficient distance between two adjacent second accommodation bodies 33 may be achieved by providing at least the first accommodation body 31 between the two adjacent second accommodation bodies 33. In one implementation, the above-described term "adjacent" may include adjacency in first directions in columns (for example, substantially longitudinal directions), and may further include adjacency in second directions in rows (for example, substantially transverse directions).

In the embodiment of the present invention, the first resonant tissues in the first accommodation bodies 31 and the second resonant tissues in the second accommodation bodies 33 have different longitudinal relaxation times T1.

Those skilled in the art should understand that the longitudinal relaxation time T1 refers to a parameter of time that has elapsed for restoring the longitudinal magnetization strength from zero to a balanced state (for example, 63% of the maximum of the longitudinal magnetization strength) after the radio-frequency excitation pulse applied in the magnetic resonance imaging system stops. It is found during the research of the present invention that the change to the longitudinal relaxation times T1 of the tissues caused by the variation in the strength of the main magnetic field where different tissues are located is minimal. Thus, even in a non-uniform magnetic field environment, the T1 value of the same resonant tissue can remain basically unchanged. However, changes in tissue composition greatly affect the longitudinal relaxation time T1. That is, resonant tissues having different compositions have quite different longitudinal relaxation times T1.

In the embodiment of the present invention, the first resonant tissues and the second resonant tissues have different longitudinal relaxation times T1, which may be implemented in one or more of the following manners. For example, as one implementation manner, the composition of the first resonant tissues is different from the composition of the second resonant tissues. Specifically, the first resonant tissues may include a first liquid, such as an aqueous solution of one compound; for example, the compound may be nickel chloride. The second resonant tissues may include a second liquid, such as water or an aqueous solution of another compound. In another implementation manner, the first resonant tissues and the second resonant tissues may be an aqueous solution of the same compound, but have different concentrations.

The first resonant tissues and the second resonant tissues have different longitudinal relaxation times T1 and are arranged at intervals on each layer of substrate. Consequently, when an image of resonant tissues in the body mold is obtained, only the image of the second resonant tissues is obtained while the first resonant tissues are inhibited, and only the image of the first resonant tissues is obtained while the second resonant tissues are inhibited. In this way, even if the resonant tissues on the substrate 21 are dense, the problem of signal interference caused by high density can be avoided by performing imaging separately several times. Meanwhile, when the images of the two types of resonant tissues are merged to perform main magnetic field evaluation on the basis of the merged image, the accuracy and resolution of evaluation are increased because of the presence of sufficiently dense sampling points. As a result, both resolution and accuracy are maintained when the body mold of the embodiment of the present invention is used to perform magnetic field evaluation.

As one example, the plurality of first accommodation bodies 31 may be hollow cavities formed on the substrate 21. The hollow cavity may further be closed, and the first resonant tissue may be formed in the hollow cavity by, for example, injection. The structure of the second accommodation body 33 and the manner of forming the second resonant tissue therein may be similar to those of the first accommodation body.

Optionally, in order to further enhance image resolution and avoid resolution failure caused by overlapping of two or more first resonant tissues in the image, two adjacent first accommodation volumes 31 are different in at least one of the following: shape and size, so that first resonant tissues therein are defined as different shapes or sizes, and are reflected in the obtained corresponding image. Moreover, for similar purposes, two adjacent second accommodation volumes may be different in at least one of the following: shape and size.

Figure 4:
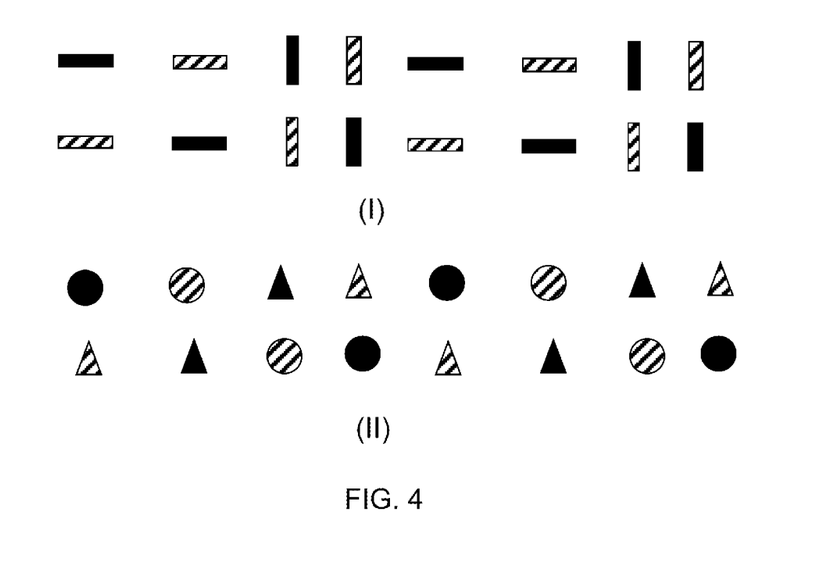
FIG. 4 schematically illustrates shapes of first accommodation volumes and second accommodation volumes in FIG. 3.

FIG. 4 schematically illustrates cross-sectional shapes of the first accommodation volumes and the second accommodation volumes in FIG. 3. As shown in the scenario (1) in FIG. 4, for example, a plurality of first accommodation volumes 31 in rows and columns thereof are sequentially configured as follows: long-flat shape, tall-thin shape, long-flat shape, tall-thin shape . . . and so on; and a plurality of second accommodation volumes 33 in rows and columns thereof are sequentially configured as follows: long-flat shape, tall-thin shape, long-flat shape, tall-thin shape . . . and so on. As shown in the scenario (II) in FIG. 4, a plurality of first accommodation volumes 31 in rows and columns thereof are sequentially configured as follows: circle, triangle, circle, triangle . . . and so on; and a plurality of second accommodation volumes 33 in rows and columns thereof are sequentially configured as follows: triangle, circle, triangle, circle . . . and so on. The aforementioned shapes or sizes may not be limited to two types, and may further have more variations according to needs. The variations in the shape or size listed above serve as examples only and are not intended to limit the present invention.

In the aforementioned approach, even if two or more resonant tissues in the image are overlapped, resolution can be more easily achieved.

Figure 5:
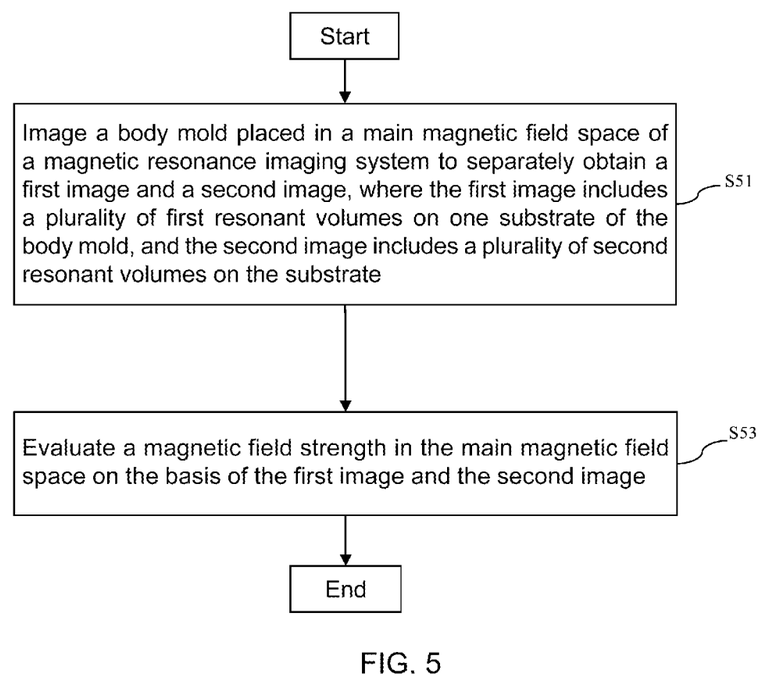
FIG. 5 is a flowchart of a main magnetic field evaluation method provided in an embodiment of the present invention.

Another embodiment of the present invention provides a main magnetic field evaluation method for a magnetic resonance imaging system. The magnetic resonance imaging system may be shown in FIG. 1. FIG. 5 shows a flowchart of the method, where the method includes steps S51 and S53.

Step S51: image a body mold placed in a main magnetic field space of the magnetic resonance imaging system to separately obtain a first image and a second image, where the body mold may be the body mold provided in the embodiment of the present invention, such as the body mold shown in FIG. 2. The first image includes a plurality of first resonant volumes on one substrate 21, and the second image includes a plurality of second resonant volumes on the substrate 21.

As shown above, the controller 120 of the magnetic resonance imaging system controls the scanner 110 to perform a scanning sequence on the body mold to obtain image data of resonant tissues in the body mold, and an image of resonant tissues on each substrate 21 can be reconstructed on the basis of the obtained image data.

Figure 6:
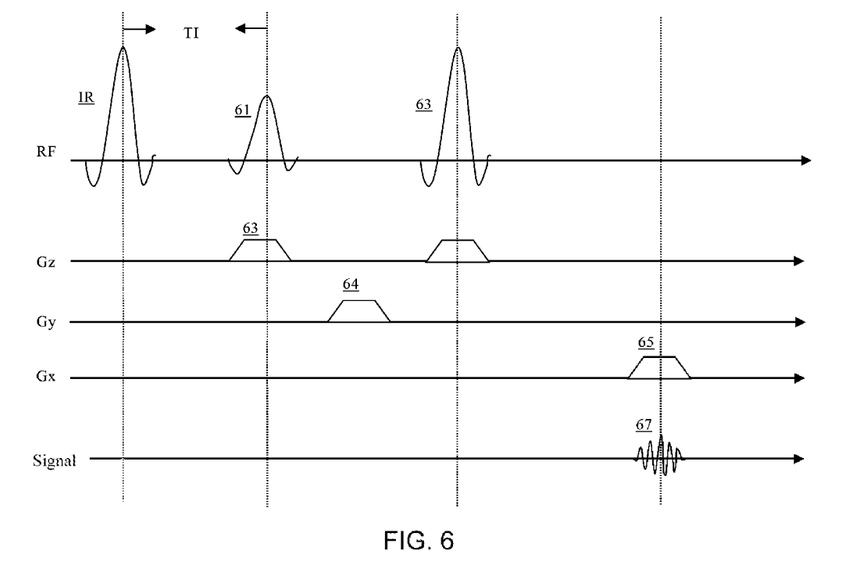
FIG. 6 is a schematic diagram of a scanning sequence adopted when the method according to the embodiment of the present invention is performed.

Specifically, one embodiment of the scanning sequence used in step S51 may be as shown in FIG. 6, which includes a radio-frequency excitation pulse 61, where the radio-frequency excitation pulse 61 is used for exciting nuclei in resonant tissues of the substrates 21 to resonate. Optionally, the scanning sequence further includes a radio-frequency refocusing pulse 62 for performing phase refocusing on a transverse magnetization vector generated after the radio-frequency excitation pulse ends. Optionally, the scanning sequence further includes a gradient pulse, for example, a slice selection gradient pulse 63, a phase encoding gradient pulse 64, and a frequency encoding gradient pulse 65. In step S51, the aforementioned first image and second image are generated on the basis of echo signals 67 which is obtained when the aforementioned scanning sequence is performed.

In order to inhibit one type of resonant volumes so that the obtained image does not include the inhibited resonant volumes, an inversion pulse IR is further included before the radio-frequency excitation pulse 61. A first inversion pulse may be applied before a radio-frequency excitation pulse to inhibit the second resonant volumes, and a second inversion pulse may be applied before a radio-frequency excitation pulse to inhibit the first resonant volumes. An inversion time T1 between the first inversion pulse and the radio-frequency excitation pulse is one half of the longitudinal relaxation time T1 of second resonant tissues, so that no magnetic resonance signal of the second resonant tissues is generated. An inversion time T1 between the second inversion pulse and the radio-frequency excitation pulse is one half of the longitudinal relaxation time T1 of first resonant tissues, so that no magnetic resonance signal of the first resonant tissues is generated.

Figure 7:
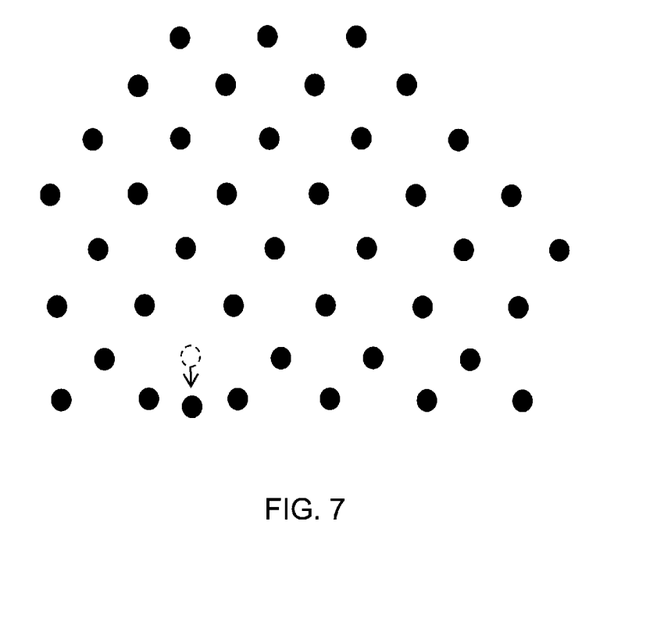
FIG. 7 illustrates a first image obtained by performing the method.
Figure 8:
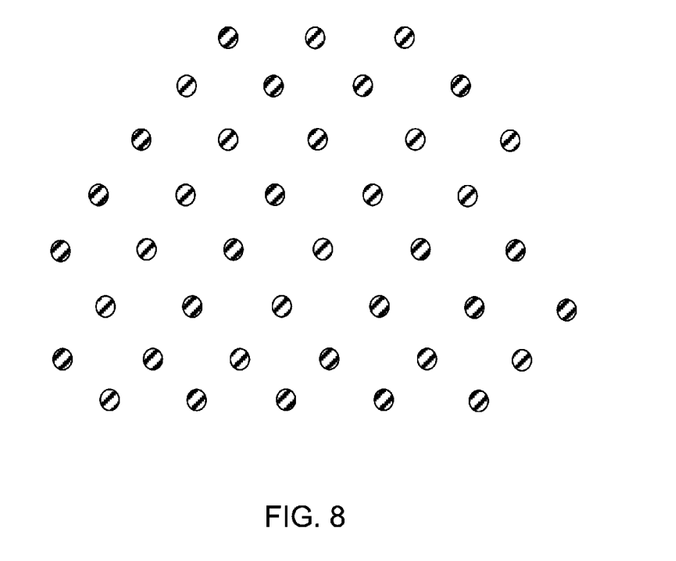
FIG. 8 illustrates a second image obtained by performing the method.

Thus, in step S51, first, a scanning sequence having the first inversion pulse may be performed to inhibit the second resonant tissues and obtain the first image, and then a scanning sequence having the second inversion pulse may be performed to inhibit the first resonant tissues and obtain the second image. The first image may be the one as shown in FIG. 7, and the second image may be the one as shown in FIG. 8. Only for the purpose of facilitating understanding and more clearly describing the resonant tissues in the images, in the figures, the first resonant tissues are represented by solids, and the second resonant tissues are represented by stripes. Position information of pixels of the first image and the second image are located in the same coordinate system.

Step S53: evaluate a magnetic field strength in the main magnetic field space on the basis of the first image and the second image. For the first image, a position where distortion occurs may be determined on the basis of the first image. On the basis of a mapping relationship between the distortion position and a physical position of the space where the body mold is located, a magnetic field strength at the physical position is evaluated. For example, the determination of the magnetic field strength of the physical position may include determining a magnetic field strength of the physical position and of a position range having a certain pixel distance from the physical position. In an example, the magnetic field strength of the physical position may be determined on the basis of magnetic field strength data in a B0 field map that is obtained in advance.

The aforementioned distortion includes at least one of the following: a position offset and a geometric deformation of a first resonant tissue in the first image (with respect to an expected position).

When the magnetic field strength at the physical position is not uniform, magnetic field strength correction may be performed. As an example, shimming correction may be implemented by increasing or decreasing shimming pieces in the magnetic field space, adjusting a main coil current, and the like.

For the second image, a magnetic field strength at a physical position where the second resonant tissue is located in the body mold may be evaluated in a similar manner.

In step S53, the evaluating a magnetic field strength in the main magnetic field space on the basis of the first image and the second image further includes: merging the first image and the second image, determining a pixel position where distortion occurs in the merged image, and determining a magnetic field strength at a physical position having a mapping relationship with the pixel position where distortion occurs in the magnetic field space.

Figure 9:
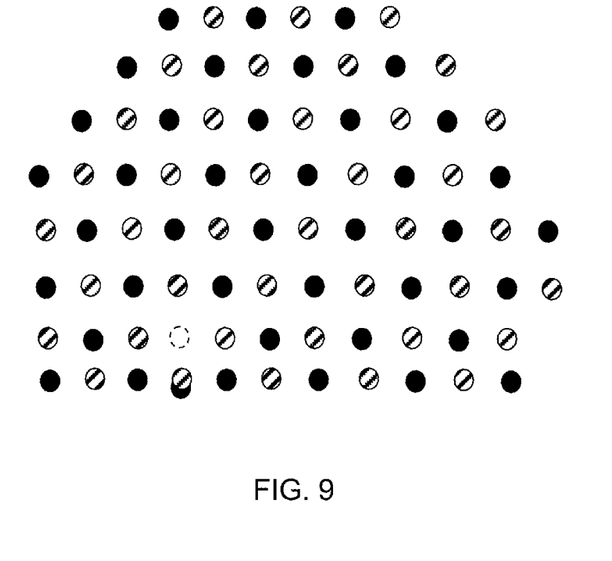
FIG. 9 illustrates an image obtained after the first image and the second image are merged.

Since the first image and the second image have the same coordinate system, the first resonant tissues and the second resonant tissues in the merged image are still at original coordinate positions thereof and maintain the same mapping relationship with positions in the magnetic field space where the body mold is located. When the main magnetic field strength is evaluated on the basis of the merged image, a doubled resolution is produced.

The merged image is shown in FIG. 9, where images of a plurality of first resonant tissues and a plurality of second resonant tissues are displayed at intervals. If a specific first resonant tissue in the image deviates from an expected position E thereof (i.e., the position of the first resonant tissue in the image without any distortion) in the image, it is considered that the first resonant tissue at the expected position is distorted. On the basis of a mapping relationship between the expected position and the physical position of the magnetic field space where the body mold is located, the physical position may be determined, and a magnetic field strength of the physical position may be further evaluated.

After the main magnetic field is shimmed, if the body mold is continuously imaged, the resonant tissues therein may still have position offset, which may be caused by a non-uniform gradient field. In the embodiment of the present invention, the performance of a gradient magnetic field of the magnetic resonance imaging system may further be evaluated on the basis of the aforementioned body mold. For example, after the shimming ends, the magnetic resonance imaging system may be used again to image the body mold according to the embodiment of the present invention, and an imaging error of the magnetic field gradient is evaluated on the basis of an actual position and an expected position of a resonant tissues in the image. For example, an error contour of the gradient field in the magnetic field space may be plotted.

Figure 10:
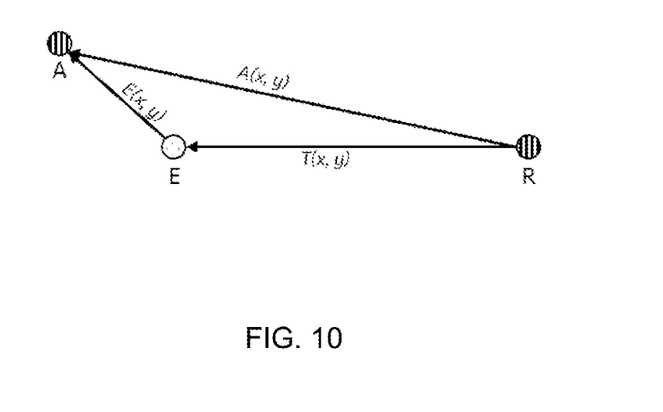
FIG. 10 illustrates a positional relationship between the following: a reference position in an image obtained by imaging the body mold, an actual position of a resonant volume in the image, and an expected position of the resonant volume in the image.

In FIG. 10, a reference position R, an actual position I, and an expected position E of a resonant tissue in the body mold in the image are shown. The reference position is a fixed position predetermined in the image, and is mapped to a physical position in the main magnetic field space where the body mold is located. The actual position is a position where the resonant tissue is actually displayed in the image. The expected position is a display position of the resonant tissue in the image in an ideal state. An imaging error of the gradient field at the physical position where the resonant tissue is located may be represented by a vector difference between the actual position and the expected position, where the vector difference may be obtained through a mathematical operation on a triangle formed by the actual position, the expected position, and the reference position.

Figure 11:
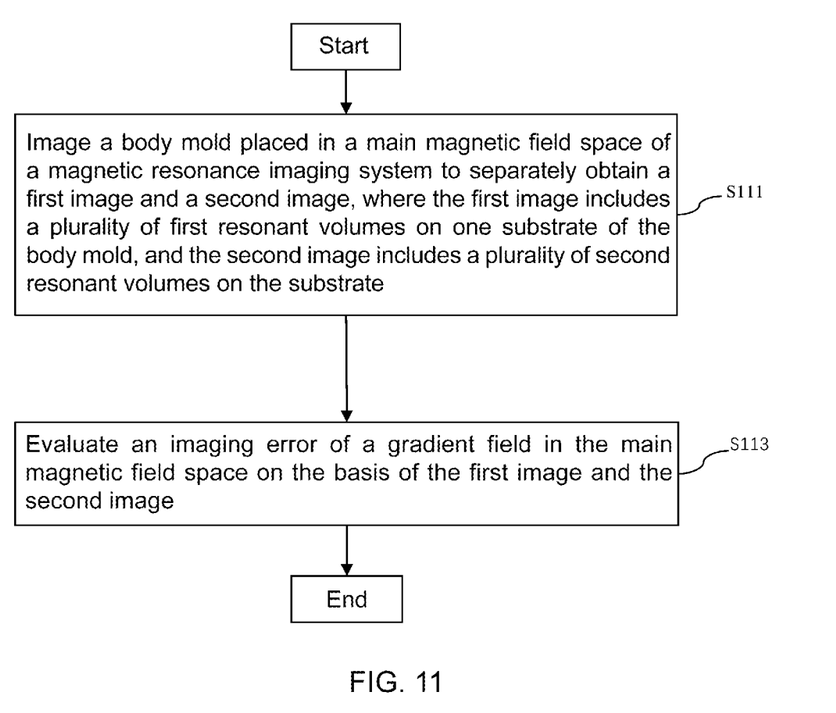
FIG. 11 is a flowchart of a gradient field evaluation method provided in an embodiment of the present invention.

Thus, an embodiment of the present invention may further provide a gradient field evaluation method for a magnetic resonance imaging system. FIG. 11 shows a flowchart of the method.

Specifically, step S111 may be similar to step S51, where a body mold placed in a main magnetic field space of the magnetic resonance imaging system is imaged to separately obtain a first image and a second image.

Step S13: evaluate an imaging error of a gradient field in the main magnetic field space on the basis of the first image and the second image.

For example, vector differences between actual positions and expected positions of a plurality of (some or all) first resonant tissues and second resonant tissues in the main magnetic field space in images (the first image and the second image or an image obtained after the first image and the second image are merged) may be obtained, and the vector differences are converted into imaging error rates, such as an imaging error rate of a gradient field of a physical mapping position of each resonant tissue, through a preset functional relationship. Generally, the closer to the scanning center, the lower the imaging error rate of the gradient field.

As used herein, an element or step described as singular and preceded by the word "a" or "an" should be understood as not excluding such element or step being plural, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements that do not have such property. The terms "including" and "in which" are used as the plain-language equivalents of the respective terms "comprising" and "wherein." Furthermore, in the appended claims, the terms "first", "second," "third" and so on are used merely as labels, and are not intended to impose numerical requirements or a particular positional order on their objects.

This written description uses examples to disclose the present invention, including the best mode, and also to enable those of ordinary skill in the relevant art to implement the present invention, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements without substantial differences from the literal language of the claims.

The invention claimed is:

1. A system comprising:
   a body mold for a magnetic resonance imaging system, comprising a plurality of substrates, wherein the plurality of substrates are sequentially arranged to form a multi-layer structure in a three-dimensional space; each substrate is provided with a plurality of first accommodation bodies that accommodate first resonant objects and a plurality of second accommodation bodies that accommodate second resonant objects, the plurality of first accommodation bodies and the plurality of second accommodation bodies are arranged at intervals, the first resonant objects and the second resonant objects are alternately arranged relative to each other in both a longitudinal direction and a transverse direction that is transverse to the longitudinal direction, and the first resonant objects and the second resonant objects have different longitudinal relaxation times T1, wherein when excited by a radio frequency, the first resonant objects and the second resonant objects generate detectable magnetic resonance signals; and
   wherein the plurality of substrates are sequentially arranged at specific angles to form the multi-layer structure having a fan-shaped cross-section.

2. The body mold according to claim 1, wherein the first resonant objects comprise a first liquid, and the second resonant objects comprise a second liquid.

3. The body mold according to claim 2, wherein the first liquid and the second liquid have different compositions.

4. The body mold according to claim 2, wherein the first liquid and the second liquid are solutions having different concentrations.

5. The body mold according to claim 2, wherein two adjacent first accommodation bodies are different in at least one of the following: shape and size.

6. The body mold according to claim 2, wherein two adjacent second accommodation bodies are different in at least one of the following: shape and size.

7. The body mold according to claim 1, wherein the angle between two substrates of the body mold farthest from each other is 180 degrees.

8. The body mold according to claim 1, wherein the body mold further comprises a first carrying element and a second carrying element for carrying the plurality of substrates, and two ends of each substrate are detachably connected to the first carrying element and the second carrying element respectively.

\* \* \* \* \*